(12) United States Patent
Da Silva et al.

(10) Patent No.: US 11,721,249 B2
(45) Date of Patent: Aug. 8, 2023

(54) TRIM ELEMENT COMPRISING AN INTEGRATED DISPLAY AREA

(71) Applicant: Faurecia Clarion Electronics Europe, Paris (FR)

(72) Inventors: Edouard Da Silva, Herblay (FR); Romain Feilleux, Epinay (FR)

(73) Assignee: Faurecia Clarion Electronics Europe, Nanterre (FR)

( * ) Notice: Subject to any disclaimer, the term of this patent is extended or adjusted under 35 U.S.C. 154(b) by 0 days.

(21) Appl. No.: 17/736,976

(22) Filed: May 4, 2022

(65) Prior Publication Data

US 2022/0358859 A1 Nov. 10, 2022

(30) Foreign Application Priority Data

May 4, 2021 (FR) ..................................... 21 04687

(51) Int. Cl.
*G09F 13/18* (2006.01)
*G09F 13/04* (2006.01)
*G09F 13/22* (2006.01)

(52) U.S. Cl.
CPC .......... *G09F 13/18* (2013.01); *G09F 13/0413* (2013.01); *G09F 13/22* (2013.01); *G09F 2013/1881* (2013.01); *G09F 2013/222* (2013.01); *G09F 2013/227* (2013.01)

(58) Field of Classification Search
CPC ...... G09F 13/18; G09F 13/0413; G09F 13/22; G09F 2013/1881; G09F 2013/222; G09F 2013/227
See application file for complete search history.

(56) References Cited

U.S. PATENT DOCUMENTS

| 9,855,845 | B2 | 1/2018 | Isobe et al. | |
| 10,688,922 | B2* | 6/2020 | Cho | G02B 6/006 |
| 10,821,889 | B2* | 11/2020 | DeGrote | B60Q 3/64 |
| 2007/0047215 | A1* | 3/2007 | Egami | G09F 19/12 |
| | | | | 362/23.15 |
| 2011/0157906 | A1* | 6/2011 | Oeuvrard | B60R 13/02 |
| | | | | 362/488 |
| 2012/0051067 | A1* | 3/2012 | Murray | G09F 13/22 |
| | | | | 29/592.1 |

(Continued)

FOREIGN PATENT DOCUMENTS

| DE | 102019206921 A1 | 11/2020 |
| FR | 3091505 A1 | 7/2020 |

OTHER PUBLICATIONS

French Search Report corresponding to French Application No. FR 2104687, dated Nov. 26, 2021, 2 pages.

*Primary Examiner* — Gary C Hoge
(74) *Attorney, Agent, or Firm* — Reising Ethington P.C.

(57) ABSTRACT

A trim element having a display area defined by a display device, and an edge piece that includes a peripheral area extending around at least part of the display area, the peripheral area being at least partly translucent, the display area and the peripheral area forming at least a part of an outer surface of the trim element. The trim element further includes an illumination device arranged to illuminate the display device to display images on the display area. The illumination device has a luminous sheet extending at least facing the display area and the peripheral area of the edge piece.

14 Claims, 3 Drawing Sheets

(56) References Cited

U.S. PATENT DOCUMENTS

2014/0085258 A1\* 3/2014 Beraud .................. G06F 3/044
　　　　　　　　　　　　　　　　　　　　　345/174
2018/0257978 A1　 9/2018 Minamidate et al.
2019/0232887 A1\* 8/2019 Benchikhi ............. B60K 35/00

\* cited by examiner

TRIM ELEMENT COMPRISING AN INTEGRATED DISPLAY AREA

This application claims the benefit of French Patent Application No. FR 21 04687 filed on May 4, 2021, which is hereby incorporated by reference.

TECHNICAL FIELD

The present invention relates to a trim element of the type comprising a display area defined by a display device, and an edge piece comprising a peripheral area extending around at least a part of the display area, said peripheral area being at least partially translucent, said display area and said peripheral area forming at least a part of an outer surface of the trim element, the trim element further comprising an illumination device arranged to illuminate the display device so as to display images on the display area.

The trim element according to the invention is a display module, for example, comprising a display device or a decorative piece comprising a display device. The invention applies to a vehicle trim element, for example.

BACKGROUND

It is known to integrate a display device into a trim element, such as a dashboard, a center console, a seat, a door panel or the like, so as to display information and/or audiovisual content for vehicle passengers.

To do so, the housing of the display device extends into the body of the trim element and the display area, for example, formed on a transparent glass or lens and on which the images of the display device are displayed, extending, for example, substantially in continuity with the outer surface of the body, for example, formed on an upholstery layer or an edge piece, so that the trim element has a substantially continuous and uninterrupted outer surface that has a satisfactory appearance.

However, in order to display content with sufficient dimensions to be comfortably visible to vehicle passengers, the display area and the housing of the display device must have large dimensions, which increases the footprint of the display in the trim element, potentially at the expense of other functional elements, and increases the cost of the trim element that integrates the display.

In addition, although the display area extends in continuity with the rest of the outer surface of the trim element, the transition between the display area and the area of the outer surface extending around the display area remains visible, which detracts from the appearance of the trim element and reduces the impression of integration of the display device into the trim element.

One object of the invention is to overcome these disadvantages by providing a trim element comprising an integrated display device with reduced space requirements and cost and with a particularly favorable appearance.

SUMMARY

To this end, the invention relates to a display device of the aforementioned type, in which the illumination device comprises a luminous sheet extending at least facing the display area and the peripheral area of the edge piece.

By providing a luminous sheet extending outside the display area, it is possible to illuminate the edge piece area that extends around the display area with the same sheet. This illumination makes it possible to artificially increase the display area of the display device and thus to present content with sufficient dimensions for the vehicle's passengers while reducing the size of the display area and the display device as a whole. In addition, the light emitted by the luminous sheet can be arranged to make the transition between the display area and the trim piece substantially invisible to the naked eye.

The trim element may further comprise one or more of the following features, considered alone or in any technically feasible combination:

- the luminous sheet is controlled by a control unit, adapted to control said luminous sheet so that a first area of said luminous sheet, extending substantially facing the display area, emits a first luminous signal, and a second area of said luminous sheet, extending facing the peripheral area, emits a second luminous signal different from the first luminous signal, said second luminous signal having a first luminosity, which is low or zero in a state of rest of said second luminous area, and a second luminosity, which is higher than the first luminosity, when the control unit activates said second area in an activated state;
- the display area comprises a transparent element comprising an outer surface and an inner surface, opposite the outer surface and turned towards the display device, the outer surface of the transparent element extending substantially in the same plane as the peripheral area of the edge piece, the trim element having a substantially continuous and uninterrupted outer surface at the transition between the display area and the peripheral area;
- the edge piece defines an opening that receives the transparent element;
- the luminous sheet is arranged to emit a light that makes the transition between the display surface and the peripheral area substantially invisible to the naked eye from outside of the trim element when the luminous sheet is activated;
- the transparent element and the edge piece are made of different materials;
- the peripheral area and/or the display area comprise at least one signaling area forming a pictogram and/or designating an area that can be activated by contact with said activatable area;
- the edge piece comprises at least one capacitive film extending facing at least the peripheral area, said capacitive film defining at least one touch button on said peripheral area, said touch button only being actuatable when said peripheral area is illuminated by the luminous sheet;
- the display device comprises a screen extending facing the display area, said screen being held by a support comprising at least a part extending facing the peripheral area, the luminous sheet extending on the reverse of said screen and said part of the support so that the light emitted by said luminous sheet passes through the screen and the part of the support before reaching the outer surface of the trim element;
- the illumination device comprises at least one light guide extending from the luminous sheet and directing the light emitted by said luminous sheet onto at least a part of the peripheral area of the edge piece;
- the luminous sheet comprises a plurality of light emitting diodes, forming a matrix of light emitting diodes, defining several sub-matrices of diodes, each sub-matrix being activatable independently of the other sub-matrices;

the luminous sheet is flexible and deformable so as to be able to conform to the shape of the trim element;

the display device and the illumination device are driven by the same control unit;

the trim element is a display module.

BRIEF DESCRIPTION OF THE DRAWINGS

Further aspects and advantages of the invention will become apparent from the following description, given by way of example and made with reference to the appended drawings, in which.

DETAILED DESCRIPTION OF EMBODIMENTS

Figure 1:
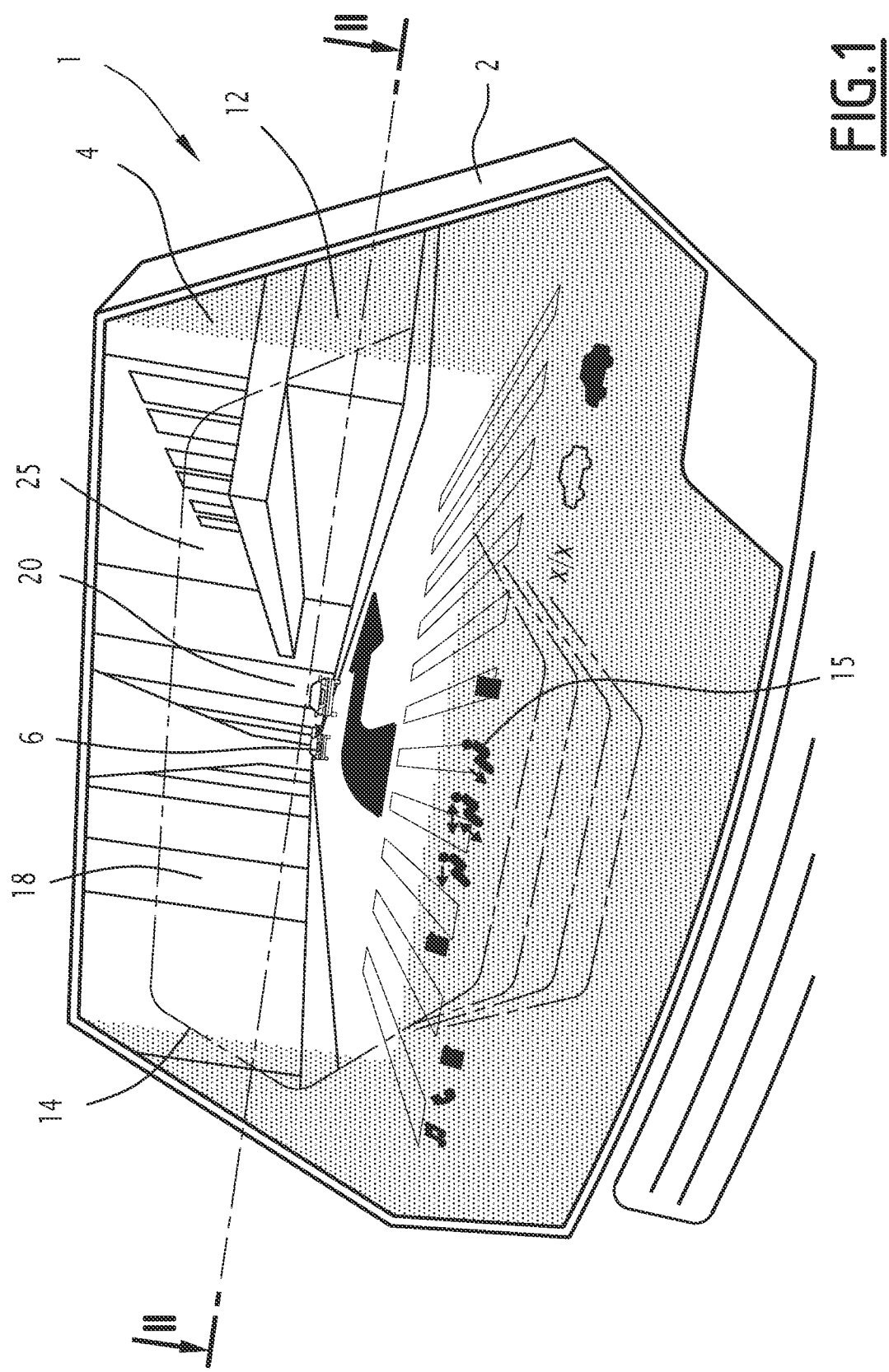
FIG. 1 is a schematic perspective representation of a trim element according to an embodiment of the invention, showing the outer surface of the trim element.
Figure 2:
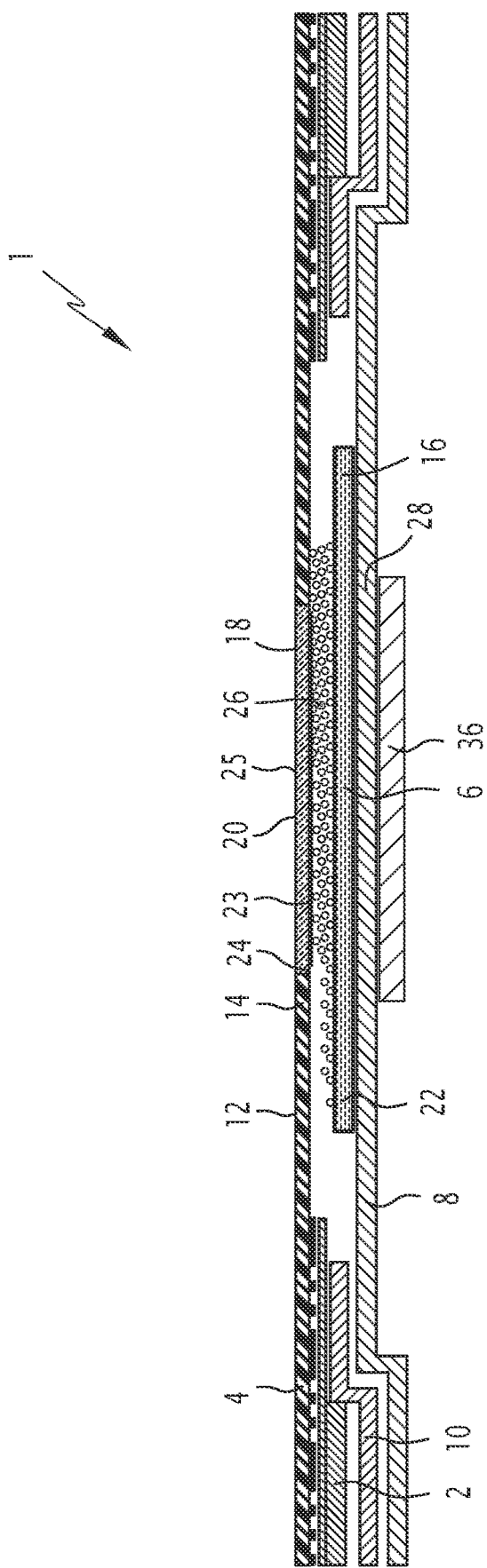
FIG. 2 is a schematic cross-sectional representation of the trim element along axis II-II of FIG. 1.

With reference to FIGS. 1 and 2, a vehicle trim element 1 is described, comprising mainly a body 2 coated with an edge piece 4, a display device 6 and a illumination device 8. Such a trim element 1 forms an instrument panel, a center console, a seat, a door panel or the like, installed in the vehicle interior, for example. In a variant, the trim element 1 forms a display module that can be integrated on another trim element such as a dashboard, etc. Such a display module forms a finished product, for example, which can be used as a stand-alone unit, for example, to be arranged in a vehicle or the room of a building or used nomadically. Thus, as shown in FIG. 1, the display module can be installed on a dashboard.

The body 2 defines the shape of the trim element and gives it its mechanical characteristics beyond the display device. The body 2 may be made of any suitable material, such as a rigid plastic material, foam or the like. The body 2 comprises at least one opening for accommodating the display device 6. Around the opening, the body 2 forms a support 10 for holding a part of the display device 6, as will be described later. According to one embodiment, the support 10 is formed by a frame extending into the body 2, particularly when the body 2 is made of foam.

The part of the body 2 intended to be turned towards the vehicle interior is at least partially covered by an edge piece 4 which also includes an opening extending facing at least a part of the opening of the body 2, for the passage of a part of the display device 6, as will be described later. The edge piece 4 has an outer surface 12, facing the surface of the edge piece 4 that is applied to the body, forming part of the outer surface of the trim element 1. Outer surface here means the surface that is visible from outside of the trim element 1, that is, visible to the vehicle passengers. Thus, the edge piece 4 defines the appearance of at least a part of the trim element 1, and the edge piece 4 may be made of any material suitable to provide a satisfactory appearance to the trim element 1. Such an edge piece 4 may be formed of a coating layer, coating the body 2. According to another embodiment, the edge piece 4 may be made in one piece with the body 2 of the trim element 1.

The edge(s) of the opening of the edge piece 4 is referred to as the peripheral area 14 of the edge piece 4. In other words, the peripheral area 14 of the edge piece 4 corresponds to the part of the edge piece 4 that surrounds at least a part of a display area defined by a display device 6, as will be described in more detail later. At least the peripheral area 14 of the edge piece 4 is translucent, that is, it lets light coming from the side of the body 2 to pass through to the outer surface 12 of the peripheral area. Translucent means a light transmission rate substantially between 5% and 100%, with a light transmission rate of less than 5% corresponding to an opaque part not letting light to pass through. Thus, at least the peripheral area 14 of the edge piece 4 lets light coming from the interior of the trim element 1 pass through, so that this light is visible on the outer surface 12 of the peripheral area 14. According to one embodiment, the entire edge piece 4 is translucent and the edge piece areas that are to not let light to pass through are then installed on an opaque part, formed by the body 2, for example. According to one embodiment, the edge piece 4 is formed by a skin of translucent synthetic material.

According to one embodiment, the peripheral area 14 may comprise opaque areas, by providing a mask extending over the inner surface of the peripheral area, for example, in order to define one or more patterns letting light pass through, to form pictograms or the like, for example. As shown in FIG. 1, such patterns are used to form at least one signaling area 15, linked to one or more functions of the vehicle or of a device connected to the vehicle, on the outer surface 12 of the peripheral area 14, as will be described in more detail later.

The support 10 of the body 2 extends at least in part facing the peripheral area 14 of the edge piece 4, so as to be able to receive the display device 8 that extends into the opening in the body 2, as will now be described.

The display device 6 comprises at least one screen 16 extending facing a transparent element 18 forming a display area 20.

The screen 16 is formed by a liquid crystal panel, for example, arranged to form images when the panel is illuminated and driven, as will be described later. The screen 16 thus lets light pass, in particular from a face turned towards the interior of the trim element to a face turned towards the exterior of the trim element and extending facing the opening of the edge piece 4. According to one embodiment more particularly visible in FIG. 3, the screen 16 comprises an opaque border 22 forming a technical part of the screen 16 that ensures the connectivity of the screen 16, for example. This opaque border 22 does not let light pass through like the rest of the screen 16. It should be noted that the screen 16 here refers only to the liquid crystal panel and not to the panel's illumination device, as may usually be the case. According to one embodiment, the screen 16 is a touch screen with which a user can interact by contact with the display surface 20. To do so, a capacitive film 23 is applied on or in the vicinity of the screen 16, such as between the screen 16 and the transparent element 18, for example, in a manner known per se.

The screen 16 extends into the opening made in the body 2, facing the opening in the edge piece 4, and is mounted on the support 10 of the body 2 that holds the screen 16 in the body 2, for example.

Figure 3:
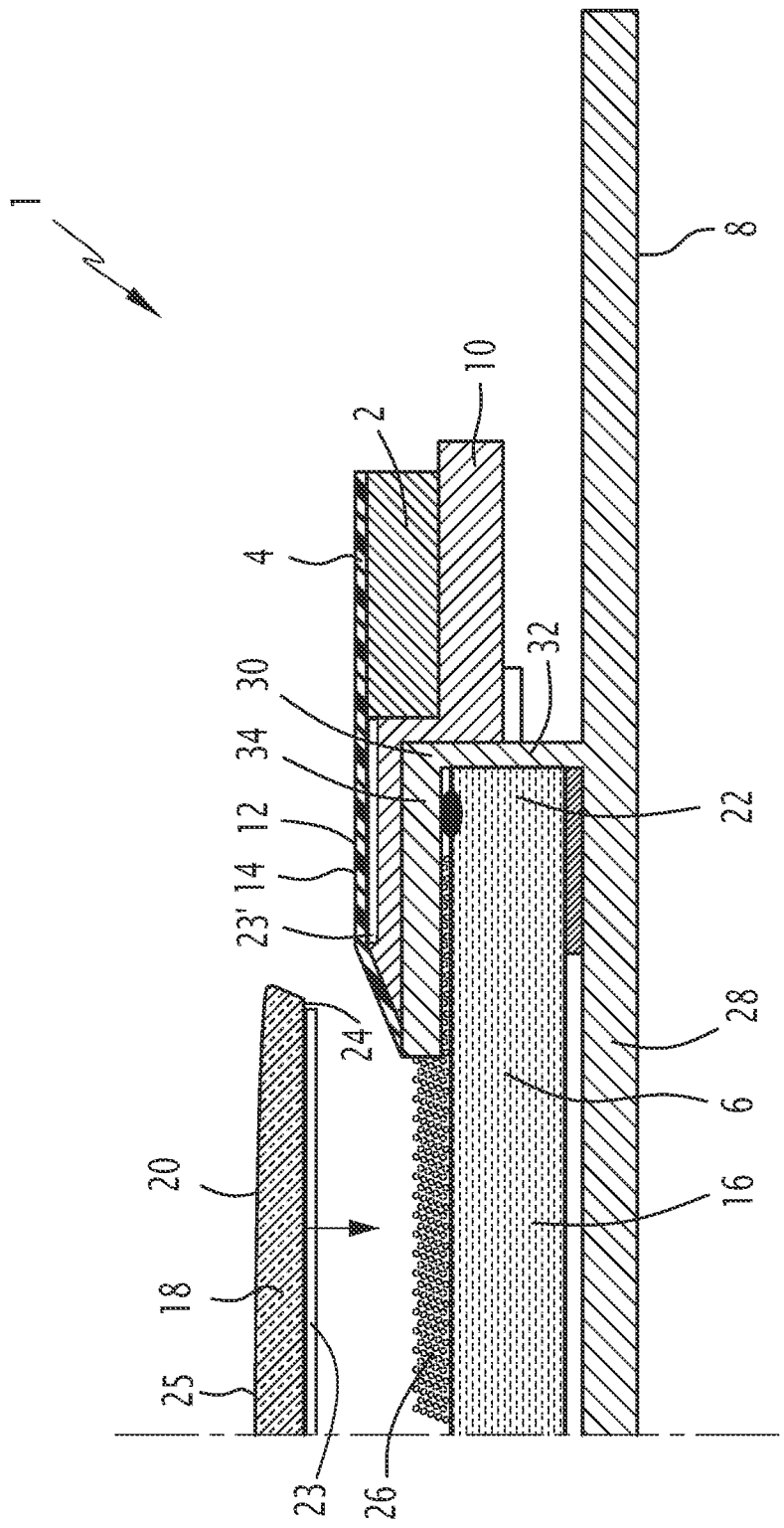
FIG. 3 is a schematic cross-sectional representation of a detail of a trim element according to one embodiment of the invention.

The transparent element 18 is formed by a pane or a lens, for example, made of plastic material, glass or the like. According to one embodiment, the transparent element 18 is made of a different material than the edge piece 4. As shown in FIGS. 2 and 3, the transparent element 18 extends into the opening of the edge piece 4 turned towards the screen 16 and is arranged for the images generated by the screen 16 to be displayed crisply on the display area 20. To this end, the transparent element 18 comprises an inner surface 24 turned towards the screen 16 and an outer surface 25, opposite the inner surface 24 and turned towards the outside of the trim element 1 and forming the display area 20. The light passing through the screen 16 is thus transmitted towards the inner surface 24 of the transparent element 18 and from the inner surface 24 to the outer surface 25 on which the images emitted by the screen 16 are displayed. To ensure good light transmission between the screen 16 and the transparent element 18, an optical transmission material 26 such as an optical adhesive may be provided between the side of the screen 16 turned towards the transparent element 18 and the inner surface 24 of the transparent element 18, as shown in FIG. 2. Such an optical adhesive further ensures a bond between the screen 16 and the transparent element 18. For a touch screen 16, it will be noted that the capacitive film 23 may also extend over the inner surface 24 of the transparent element 18. It will be noted that such a capacitive film 23' may also be provided to form one or more touch surfaces on the outer surface 12 of the peripheral area 14, for example, opposite one or more signaling areas 15. In a variant, different capacitive films are provided to make the display area 20 tactile and to make the peripheral area 14 tactile.

According to one advantageous embodiment, the display area 20 extends substantially in the same plane as the peripheral area 14 of the edge piece 4 so that the trim element 1 has a substantially continuous outer surface, formed at least in part by the outer surface 12 of the edge piece 4 and by the display area 20. More particularly, the transparent element 18 and opening of the edge piece 4 are fitted to each other, for example, such that the outer surface of the trim element is substantially uninterrupted at the transition between the outer surface 12 of the peripheral area 14 and the display area 20. In other words, the edge opening(s) of the edge piece abut the edge(s) of the transparent element 18. Again in other words, the opening of the edge piece 4 has a shape substantially complementary to that of the transparent element 18. It should be noted that the transparent element 18 may have any suitable shape, corresponding to the shape of the screen 16, for example. For example, the transparent element 18 may be substantially rectangular, rectangular with rounded corners, oblong, circular or the like. It will also be noted that the invention is not limited to a flat outer surface of the trim element. Thus, the display area 20 may be slightly domed or curved, for example. In this case, "the display area 20 extends substantially in the same plane as the peripheral area 14 of the edge piece 4" means that the peripheral area 14 follows substantially the same curvature as the display area 20 so that the outer surface of the trim element 1 has a continuity at the transition between the peripheral area 14 and the display area 20. Thus, according to one example, the peripheral area 14 has a radius of curvature substantially equal to that of the display area 20, for example.

By having a substantially continuous and uninterrupted outer surface between the edge piece 4 and the display area 20, the trim element is given a particularly satisfactory appearance, enhancing the impression of integration of the display device 6 into the trim element 1. In order to further enhance this impression, dying the transparent element 18 may be considered, or adding a colored film on the display area 20, so that the transparent element 18 has the same appearance as the edge piece 4, especially when the display device is off and not illuminated by the illumination device 8, as will be described later. Thus, in the case of a black edge piece 4, the transparent element 18 may be smoked, for example, so that, when viewed from the outside, the presence of the display device 6 is hardly or not at all visible in relation to the rest of the trim element 1 when the illumination device 8 is not activated. If a colored film is applied to the outer surface 25 of the transparent element 18, then the outer face of this film forms the display area 20 and extends in continuity with the outer surface 12 of the peripheral area 14.

According to one embodiment, one or more areas of the transparent element 18 may be textured to form one or more signaling areas in addition to the signaling areas 15 provided in the peripheral area 14, for example. The transparent element 18 may be subjected to laser radiation, for example, to create micro-texturing in one or more areas of the inner surface 24 and/or the outer surface 25 of the transparent element 18 and thereby create one or more patterns, defining pictograms on the display area, for example, which appear when the display area is illuminated. The laser radiation is used to modify the tribological characteristics of the transparent element 18 to create areas of passive haptic feedback on the display area 20, with the transition between these areas and the remainder of the display area 20 being substantially invisible to the naked eye from outside of the trim element 1.

According to one embodiment, the screen 16 has larger dimensions than the transparent element 18 such that a part of the screen 16, in particular one or more edges, extends facing a part of the peripheral area 14 of the trim element. According to this embodiment, the images generated by this part of the screen 16 are thus displayed on the outer surface 12 of a part of the peripheral area 14, as will be described in more detail later.

The illumination device 8 is arranged to illuminate the display device 6 and the peripheral area 14 of the edge piece 4 when activated. In other words, the illumination device 8 does not only illuminate the display device 6, as is usually the case, but also illuminates an area extending around the display device 6. To this end, the illumination device 8 comprises a luminous sheet 28 extending facing the display device 6 and the peripheral area 14 of the edge piece 4 and arranged to emit light towards the display area 20 and the outer surface 12 of the peripheral area 14. In other words, the same luminous sheet extends at least facing the display area 20 and the peripheral area 14. More particularly, the luminous sheet 28 extends on the side of the inner face of the screen 16 and closes the opening of the body 2 facing the edge piece 4, as shown in FIGS. 2 and 3. In other words, the luminous sheet 28 extends on the reverse side of the screen 16 and the part of the support 10 extending facing the peripheral area 14, so that the light emitted by the luminous sheet 28 passes through the screen 16 and this part of the support 10 before reaching the outer surface of the trim element, the same luminous sheet 28 illuminating both the display area 20 and the peripheral area 14.

Thus, the light emitted by the luminous sheet 28 passes through the entire screen 16 as well as the peripheral area 14, for example, by passing through the screen 16, for the part that extends facing the peripheral area, and through the support 10, which is then arranged to let light to pass through to illuminate a part of the peripheral area 14 that does not extend facing the screen 16, for displaying other images thereon, as will be described later, and/or to create ambient illumination giving the impression of an enlarged display surface beyond the display area 20 of the transparent element itself. More particularly, the luminous sheet 28 may be used to make the transition between the display area and the outer surface 12 of the peripheral area 14 substantially invisible to the naked eye from outside of the trim element when the luminous sheet is activated, by continuously illuminating the display area 20 and the peripheral area 14 and selecting an emitted light suitable for this purpose.

Such illumination of the outer surface of the trim element 1 is particularly advantageous in that it gives the impression of a large display area while the display device 6 can have a small footprint, thereby reducing production costs of the trim element and releasing space for other functions, as will be described later. In addition, by making the transition between the peripheral area 14 and the display area 20 substantially invisible, the impression of integration of the display device 6 into the trim element is improved, giving the trim element a particularly satisfactory appearance.

According to one embodiment, the illumination device 8 comprises at least one light guide 30, extending from the luminous sheet 28 and bringing the light emitted by said luminous sheet 28 onto at least a part of the peripheral area 14 of the edge piece. This light guide 30 is useful in the case where the screen 16 comprises an opaque border 22, for example, preventing the light emitted by the luminous sheet 28 from passing through the screen 16 in this border. The light guide 30 then brings the light emitted by this sheet 28 facing the opaque border 22 between the screen 16 and the peripheral area 14 of the edge piece 4, as shown in FIG. 3. In a variant or additionally, the light guide 30 may also bring the light facing a part of the display area 20. The light guide 30 is made of a transparent material, for example. The light guide 30 comprises a first leg 32, extending from the luminous sheet 28 along an edge of the screen 16 from the inner side to the outer side thereof, and a second leg 34, extending from the end of the first leg 32 facing the luminous sheet 28 on the opaque edge 22 of the screen 16, for example. The second leg 34 is arranged to emit the light it receives toward the outer surface of the trim element 1. Thus, the presence of an opaque border 22 does not interrupt the illumination continuity of the outer surface of the trim element 1.

The luminous sheet 28 is formed by a sheet of light-emitting diodes, for example. Thus, the luminous sheet 28 comprises a plurality of light emitting diodes (not shown) forming a diode matrix. The diode matrix defines a plurality of diode sub-matrices that can be activated independently of each other and/or that can each emit a light signal that is the same as and/or different from the light signals emitted by the other sub-matrices. In other words, the luminous sheet 28 can be made to emit different light signal types in different areas thereof. Different light signals means different colors and/or different light intensities. Thus, the light illuminating the display area 20 is not necessarily the same as the light illuminating the peripheral area 14, and these lights can be modulated, in particular to make the transition between the display area 20 and the peripheral area 14 substantially invisible to the naked eye from the outside of the trim element 1, or to create lighting effects such as animations on the outer surface of the trim element 1. Thus, by way of example, the light illuminating the transition between the display area 20 and the peripheral area 14 and the light illuminating the remainder of the peripheral area may be arranged to create a fading effect on the outer surface of the trim element, so as to create a smooth transition between the illuminated part of the outer surface of the trim element and the non-illuminated part of the outer surface.

According to one embodiment, the luminous sheet 28 is controlled so that a first area of the luminous sheet 28, extending substantially facing the display area 20, emits a first light signal and a second area of the luminous sheet 28, extending facing the peripheral area 14, emits a second light signal different from the first light signal. The second light signal has a first brightness, for example, which is low or zero, in a resting state of the second light area, and a second brightness, which is higher than the first brightness, when the second area is put to be in an activated state. The resting state is used to mask what extends below the peripheral area 14 from the exterior of the trim element, despite the translucency of the peripheral area 14, while the activated state is used to illuminate the peripheral area 14 as described above, to extend the display area 20, for example.

In addition, the light emitted by certain sub-arrays of diodes is used to illuminate the signaling area(s) 15 provided in the peripheral area 14 and/or the display area 20, to signal that a function of the vehicle has been activated or is activatable, for example, by touch contact with the illuminated signaling area 15 for example. Thus, the illumination of a signaling area 15 signals to a user that a function can be activated, deactivated, and/or controlled by tactile contact with that signaling area, for example. The functions concerned are functions related to the vehicle, the display device 6 and/or a device connected to the vehicle, for example, such as a cell phone or the like. Similarly, it may be possible to modify the lighting of the signaling area 15, by modifying the color of the light illuminating this area, for example, in order to indicate a change of state of the function. According to one embodiment, the signaling area or areas 15 are substantially invisible to the naked eye from outside of the trim element when the function associated with that area is not activatable and/or is not activated, by illuminating those signaling areas 15 with light identical to the light illuminating the rest of the outer surface, for example. Thus, the information displayed on the outer surface of the trim element is scalable and the pictograms or icons appear only when relevant by being illuminated in a particular way by the luminous sheet 28. Thus, by way of example, the capacitive film extending over the edge piece 4 defines at least one touch button on the peripheral area 14 and this touch button is only operable when the peripheral area 14 is illuminated by the luminous sheet 28.

When part of the images generated by the screen 16 is displayed on the peripheral area 14, as previously described, these images may be of the same type as those displayed on the display area 20 so as to create an enlarged display surface and/or may be of a different type, to form icons or pictograms on the peripheral area to create additional signaling areas, for example.

The luminous sheet 28 is flexible and deformable, for example, so that its shape can be adapted to its environment in the trim element, as more particularly visible in FIG. 2. Indeed, such a luminous sheet 28, formed by an array of diodes, for example, can be particularly thin (its thickness is substantially in the range of 1 mm to 5 mm, for example, preferably in the range of 2 mm to 3 mm), making it space-saving, flexible and able to adopt the desired shape. Thus, the luminous sheet 28 can follow the shape of the back of the screen 16 and the part of the support 10 against which it is applied and thus ensure good light transmission in these elements.

As described above, the same luminous sheet 28 illuminates the display area 20 and the peripheral area 14, but it is understood that the trim element 1 may include other luminous sheets or other lighting elements, to illuminate areas outside the display area 20 and the peripheral area 14, for example.

The luminous sheet 28 is controlled by a single control unit 36. In other words, the same control unit 36 manages the lighting of the display area 20 and that of the peripheral area. Advantageously, operating the display device 6 and illumination device 8 can be performed by the same control unit 36, formed by a single printed circuit board, for example, extending on the reverse side of the luminous sheet 28, as shown in FIG. 2, for example. The use of a single control unit 36 further reduces the space requirement of the display device 6 and the illumination device 8 in the trim element and thus frees up space for the integration of other functionalities in the trim element, such as heating areas, operating buttons or the like.

The above-described trim element allows for the integration of a display device 6 with the rest of the trim element in a harmonious, space-saving and economical manner by illuminating an area of the outer surface of the edge piece 4 extending around the display area 20 with the same luminous sheet 28 used to illuminate the screen 16 of the display device 6. Thus, the dimensions of the display device 6 can be reduced while maintaining a satisfactory display area extending over both the display area 20 and the peripheral area 14 extending around display area 20.

The invention claimed is:

1. A trim element comprising a display area defined by a display device, and an edge piece comprising a peripheral area extending around at least a part of the display area, said peripheral area being at least partially translucent, said display area and said peripheral area forming at least a part of an outer surface of the trim element, the trim element further comprising an illumination device arranged to illuminate the display device in order to display images on the display area, wherein the illumination device comprises a luminous sheet extending at least facing the display area and the peripheral area of the edge piece.

2. The trim element according to claim 1, wherein the luminous sheet is controlled by a control unit adapted to control said luminous sheet so that a first area of said luminous sheet, extending facing display area, emits a first light signal and a second area of said luminous sheet, extending facing the peripheral area, emits a second light signal different from the first light signal, said second light signal having a first luminosity, which is low or zero, in a state of rest of said second light area, and a second luminosity, which is higher than the first luminosity, when the control unit activates said second area in an activated state.

3. The trim element according to claim 1, wherein the display area comprises a transparent element comprising an outer surface and an inner surface, opposite the outer surface and turned towards the display device, the outer surface of the transparent element extending in the same plane as the peripheral area of the edge piece, the trim element having a continuous and uninterrupted outer surface at the transition between the display area and the peripheral area.

4. The trim element according to claim 3, wherein the edge piece defines an opening receiving the transparent element.

5. The trim element according to claim 2, wherein the luminous sheet is arranged to emit light, making the transition between the display surface and the peripheral area invisible to the naked eye from outside of the trim element when the luminous sheet is activated.

6. The trim element according to claim 3, wherein the transparent element and the edge piece are made of different materials.

7. The trim element according to claim 1, wherein the peripheral area and/or the display area comprise at least one signaling area forming a pictogram and/or designating an area that can be activated by contact with said activatable area.

8. The trim element according to claim 1, wherein the edge piece comprises at least one capacitive film extending facing at least the peripheral area, said capacitive film defining at least one touch button on said peripheral area, said touch button being operable only when said peripheral area is illuminated by the luminous sheet.

9. The trim element according to claim 1, wherein the display device comprises a screen extending facing the display area, said screen being held by a support comprising at least a part extending facing the peripheral area, the luminous sheet extending across the back of said screen and said part of the support so that light emitted by said luminous sheet passes through the screen and the part of the support before reaching the outer surface of the trim element.

10. The trim element according to claim 9, wherein the illumination device includes at least one light guide extending from the luminous sheet and directing the light emitted by said luminous sheet onto at least a part of the peripheral area of the edge piece.

11. The trim element according to claim 1, wherein the luminous sheet comprises a plurality of light emitting diodes forming a light emitting diode array defining a plurality of diode sub-matrices, each sub-array being activatable independently of the other sub-matrices.

12. The trim element according to claim 1, wherein the luminous sheet is flexible and deformable so that it can conform to the shape of the trim element.

13. The trim element according to claim 1, wherein the display device and the illumination device are driven by a single control unit).

14. The trim element according to claim 1, wherein the trim element is a display module.

* * * * *